United States Patent [19]

Ito

[11] 4,170,375
[45] Oct. 9, 1979

[54] PIPE JOINT

[76] Inventor: Mitsuo Ito, 22-23 Motogo 3, Saitama-ken, Kawaguchi-shi, Japan

[21] Appl. No.: 887,294

[22] Filed: Mar. 16, 1978

[51] Int. Cl.² ............................................. F16L 33/20
[52] U.S. Cl. .............................. 285/348; 277/DIG. 2
[58] Field of Search ............... 285/337, 348, 342, 363, 285/368; 277/DIG. 2

[56] References Cited

U.S. PATENT DOCUMENTS

| 2,480,858 | 9/1949 | Hobbs | 285/337 |
| 3,025,084 | 3/1962 | Franck | 285/342 |
| 4,008,911 | 2/1977 | Kiyooka | 285/348 |

*Primary Examiner*—Robert I. Smith
*Attorney, Agent, or Firm*—Holman & Stern

[57] ABSTRACT

A pipe joint with which pipes are securely connected through very simple operation so that the pipes will not come out after they have been connected and the joint is flexible, permitting no leakage of fluid flowing therein.

2 Claims, 3 Drawing Figures

FIG. 1
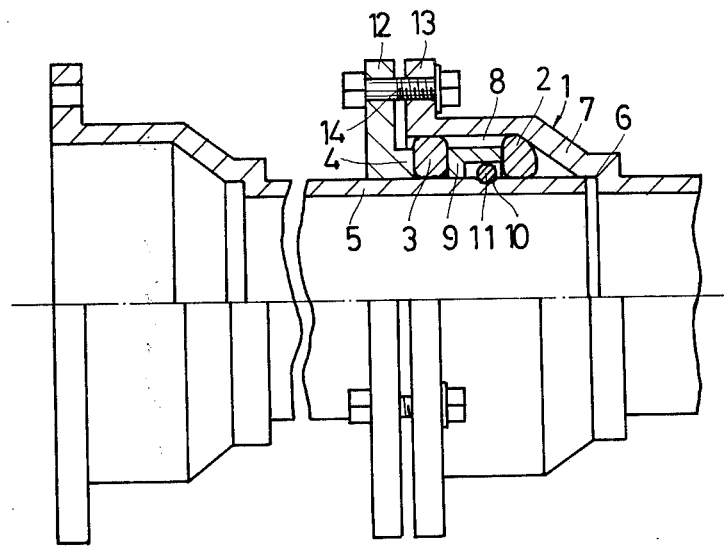
FIG. 3
FIG. 2
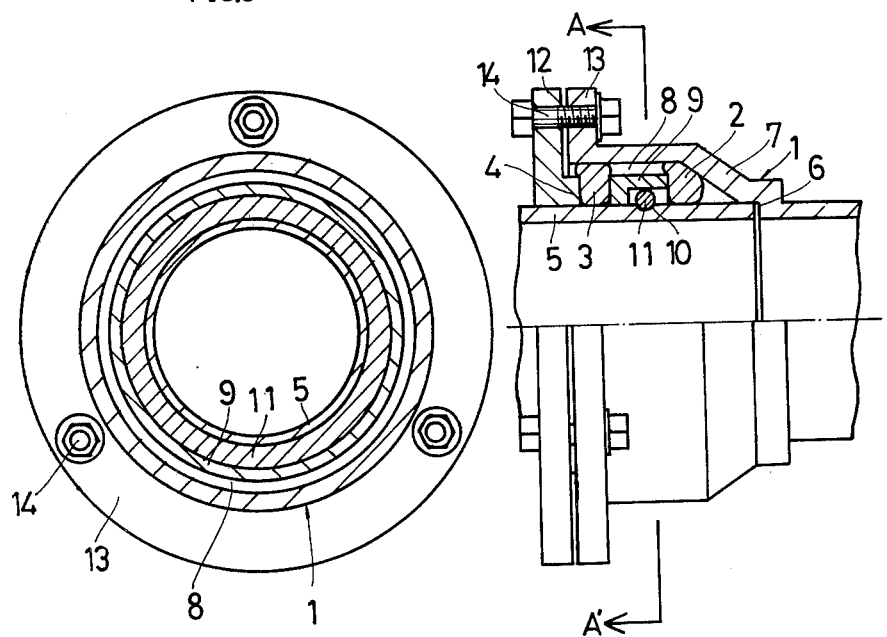

PIPE JOINT

SUMMARY OF THE INVENTION

This invention relates to a pipe joint comprising a joint body, packing members inserted within the joint body for sealing the connected pipes, and a presser ring for closely pressing the packing members against the outer peripheral surface of the pipes to insure that the packing members may perform their sealing function accurately.

Conventionally, pipe joints of a variety of constructions have been proposed. The present invention, however, is characterized in that there is provided a peripheral groove on the outer surface of the pipe to be connected, in which groove is mounted an O-ring which is to be fastened to the joint body by means of a presser ring through a counter ring so that the pipes are accurately connected and, furthermore, they are supported by two pieces of rubber packings each inserted thereon so that they are provided with flexibility and operated very simply and no leakage nor turbulence of fluid occurs at the point of connection.

BRIEF DESCRIPTION OF THE DRAWINGS

The accompanying drawings show one preferred embodiment of a pipe joint according to the present invention, in which:

FIG. 1 is a side view of the pipe joint with its half portion being cut off;

FIG. 2 is a side view thereof when fastened together; and

FIG. 3 is a sectional view along the line A—A' in FIG. 2.

DETAILED DESCRIPTION OF THE INVENTION

The present invention relates to improvements in or relating to a pipe joint.

The invention comprises a tubular joint body, packings to be inserted within the body, and a presser ring for pressing the packings closely against the outer peripheral surface of the pipe to be connected, said joint body having a step means for receiving the end of a pipe to be connected in such a fashion that the inner diameter of the joint body and that of the pipe to be connected may coincide with each other and, furthermore, the joint body is provided, adjacent to the step means, with an enlarging slant portion forming a gap between this slant portion and the pipe inserted into the joint body, positioning said packings within the gap and pressing the packings with the presser ring member.

Now, a preferred embodiment of the pipe joint of this invention will be described in detail with reference to the accompanying drawings.

In the drawings, 1 is a tubular pipe joint; 2 and 3 are packings; 4 is a presser ring member for the packings 2 and 3; and 5 is a pipe to be connected.

The tubular body 1 is provided with a step means 6 for abutment of the pipe 5 thereto. Through the portion of this step means 6 the inner diameter of the pipe 5 and that of the joint body 1 are in coincidence with each other so that any turbulence of fluid flowing therein is avoided.

Also, the body 1 is provided, adjacent to the step means 6, with an enlarging slant portion 7 which, together with the pipe 5 inserted into the body 1, provides a gap 8 within the inner peripheral surface of the body 1.

Within this gap 8 there are positioned the packings 2, 3 that are inserted onto the pipe 5, and between the packings 2 and 3 there is provided a counter ring 9 for pressing against the O-ring 11 which has a cut therein to render itself flexible and which is inserted in the peripheral groove 10 provided on the surface of the pipe 5. The packings 2 and 3 are arranged to be pressed by the presser ring 4 with its flange 12 being fastened with the flange 13 of the end edge of the body 1 with the bolt 14, the fastening force of which presses the packings closely against the pipe.

According to the present invention, any turbulence of the fluid flowing through the connected pipes is avoided since the inner diameter of the joint body and that of the connected pipes coincide with each other. Also, any fluid leakage is completely prevented because of the packings being closely pressed against the pipe by the counter ring member. In addition, the connecting operation is very easy and the invention has thus a great economical value.

I claim:

1. A pipe joint comprising a first pipe member, a joint body at one end of said first pipe member, said joint body including an outwardly inclined portion adjacent said first pipe member and a substantially constant diameter portion adjoining said inclined portion, said substantially constant diameter portion being of larger diameter than said first pipe member, a second pipe member having one end receivable in said enlarged joint body with an annular clearance between said second pipe member and said substantially constant diameter section of said joint body, a sealing assembly receivable within said clearance, said sealing assembly including first and second annular packing members, an annular sealing ring between said packing members and a counter-ring surrounding said sealing ring, the joint further including pressure applying means for applying axial pressure against said sealing assembly for pressing said assembly against said inclined portion of said joint body thereby applying inward pressure against said second pipe member wherein said second pipe member has an outer surface including a pre-formed circumferential groove receiving said sealing ring prior to the application of pressure to said sealing assembly by said pressure applying means.

2. The pipe joint as defined in claim 1 wherein said pressure applying means comprising a pressure ring surrounding said pipe member adjacent said sealing assembly, first and second flange means on said pressure ring and on said joint body respectively and screw-tightening means connected between said first and second flange means.

* * * * *